(12) United States Patent
Hwang et al.

(10) Patent No.: US 7,369,882 B2
(45) Date of Patent: May 6, 2008

(54) SLIDING/SWING-TYPE PORTABLE APPARATUS HAVING SELF-RETAINING FUNCTION

(75) Inventors: Chang-Hwan Hwang, Goyang-si (KR); Young S. Kim, Los Altos, CA (US)

(73) Assignee: Samsung Electronics Co., Ltd (KR)

( * ) Notice: Subject to any disclaimer, the term of this patent is extended or adjusted under 35 U.S.C. 154(b) by 354 days.

(21) Appl. No.: 11/122,120

(22) Filed: May 4, 2005

(65) Prior Publication Data

US 2005/0250532 A1 Nov. 10, 2005

Related U.S. Application Data

(60) Provisional application No. 60/568,997, filed on May 6, 2004.

(30) Foreign Application Priority Data

Jun. 25, 2004 (KR) .................. 10-2004-0048191
Apr. 4, 2005 (KR) .................. 10-2005-0028255

(51) Int. Cl.
*H04B 1/38* (2006.01)

(52) U.S. Cl. ............... 455/575.1; 455/90.3; 455/575.3; 455/575.4; 455/575.8; 455/573; 455/571; 379/428.01; 379/433.12; 379/433.13; 379/433.08; 361/681; 361/683

(58) Field of Classification Search ........ 455/90.3, 455/575.1, 575.3, 575.4, 575.8, 573, 571; 379/433.12, 433.13; 361/681, 683
See application file for complete search history.

(56) References Cited

U.S. PATENT DOCUMENTS

| | | | |
|---|---|---|---|
| 5,475,752 A * | 12/1995 | Mischenko | 379/433.11 |
| 5,491,507 A | 2/1996 | Umezawa et al. | |
| 5,933,330 A * | 8/1999 | Beutler et al. | 361/814 |
| 6,177,950 B1 * | 1/2001 | Robb | 348/14.01 |
| 6,188,917 B1 * | 2/2001 | Laureanti | 455/573 |
| 6,243,595 B1 * | 6/2001 | Lee et al. | 455/566 |
| 6,275,714 B1 * | 8/2001 | Kintz et al. | 455/566 |
| 6,292,980 B1 * | 9/2001 | Yi et al. | 16/303 |
| 6,470,175 B1 * | 10/2002 | Park et al. | 455/90.1 |
| 6,484,016 B1 * | 11/2002 | Cheon | 455/90.1 |
| 6,571,086 B1 * | 5/2003 | Uusimaki | 455/90.3 |
| 6,754,507 B2 * | 6/2004 | Takagi | 455/550.1 |

(Continued)

FOREIGN PATENT DOCUMENTS

CN 1183689 6/1998

(Continued)

*Primary Examiner*—Marceau Milord
(74) *Attorney, Agent, or Firm*—The Farrell Law Firm, PC

(57) ABSTRACT

A sliding/swing-type portable apparatus having a self-retaining function includes a main body; a battery cover coupled to the bottom surface of the main body in a predetermined position so that it can rotate about a first hinge axis toward or away from the main body and provided with a folding force, at less than a first angle relative to the bottom surface of the main body, in such a direction that it is folded on the main body, an unfolding force at the first angle or more, and a retaining force at a second angle for retaining the main body in an upright position, at a slant; and a battery pack attached to and detached from the battery cover.

27 Claims, 17 Drawing Sheets

U.S. PATENT DOCUMENTS

| | | |
|---|---|---|
| 6,957,083 B2 * | 10/2005 | Ikeda et al. ............... 455/556.1 |
| 6,970,728 B2 * | 11/2005 | Chenoweth et al. ..... 455/575.7 |
| 7,013,167 B2 * | 3/2006 | Pan ......................... 455/575.1 |
| 7,034,755 B2 * | 4/2006 | Takagi ........................ 343/702 |
| 7,106,357 B2 * | 9/2006 | Fukuda et al. ........... 348/14.02 |
| 7,111,773 B1 * | 9/2006 | So et al. ..................... 235/1 D |
| 7,123,945 B2 * | 10/2006 | Kokubo ...................... 455/566 |
| 7,155,266 B2 * | 12/2006 | Stefansen ................ 455/575.3 |
| 7,184,802 B2 * | 2/2007 | Chadha ................... 455/575.1 |
| 7,231,039 B2 * | 6/2007 | Gronroos et al. ...... 379/428.02 |
| 7,231,188 B2 * | 6/2007 | Godston et al. .............. 455/73 |

FOREIGN PATENT DOCUMENTS

| | | |
|---|---|---|
| DE | 297 13 765 | 9/1997 |
| DE | 297 13 766 | 9/1997 |
| EP | 0 927 922 | 7/1999 |
| EP | 1 324 571 | 2/2003 |
| WO | WO 02/098123 | 12/2002 |
| WO | WO 03/050665 | 6/2003 |

* cited by examiner

SLIDING/SWING-TYPE PORTABLE APPARATUS HAVING SELF-RETAINING FUNCTION

PRIORITY

This application claims priority to an application entitled "Sliding/swing-type Portable Apparatus Having Self-retaining Function" filed with the U.S. Patent Office on May 6, 2004 and assigned Ser. No. 60/568,997, an application entitled the same filed with the Korean Intellectual Property Office on Jun. 25, 2004 and assigned Ser. No. 2004-48191, and an application entitled the same filed with the Korean Intellectual Property Office on Apr. 4, 2005 and assigned Ser. No. 2005-28255, the contents of which are incorporated herein by reference.

BACKGROUND OF THE INVENTION

1. Field of the Invention

The present invention relates to portable communication, and more particularly to a sliding/swing-type portable apparatus with a self-retaining function and a detachable battery pack, that provides stereo sound, and can be stably retained and maintain the retained state.

2. Description of the Related Art

In general, "portable communication apparatus" refers to an electronic apparatus that a user can carry to perform wireless communication. To facilitate portability, designs of such portable communication apparatuses tend not only to be compact, slim, and light, but also provide multimedia availability, with a wider variety of functions. In particular, future portable communication apparatuses are expected to incorporate greater multi-functionality and be capable of multi-purpose utilization, in addition to being even more compact Further, they will be capable of modification for various multimedia or Internet environments. Portable communication apparatuses are now commonly used by people of all ages and all walks of life throughout the world, and are recognized by most as a nearly indispensable commodity to be carried at all times.

Conventional portable communication apparatuses may be classified into various categories according to appearance, such as a bar-type portable communication apparatus, a flip-type portable communication apparatus, and a folder-type portable communication apparatus. The bar-type communication apparatus has a single housing shaped like a bar. The flip-type communication apparatus has a flip rotatably coupled to a bar-shaped housing by a hinge device. The folder-type communication apparatus has a folder connected to a single bar-shaped housing by a hinge device in such a manner that the folder can be rotated to fold onto, or unfold away from, the housing.

A portable communication apparatus may also be classified into a neck wearable and a wrist wearable type portable communication apparatus according to the position or way in which a user wears the portable communication apparatus. The neck wearable type portable communication apparatus is worn around the user's neck on a string, and the wrist wearable type portable communication apparatus is worn around the user's wrist.

In addition, a portable communication apparatus may be classified into a rotation-type portable communication apparatus and a sliding-type portable communication apparatus according to the manner of opening and closing the portable communication apparatus. In the rotation-type portable communication apparatus, two housings are coupled to each other in such a manner that one housing rotates to be opened or closed relative to the other, while they face each other. In the sliding-type portable communication apparatus, two housings are coupled to each other in such a manner that one housing slides along a longitudinal direction to be opened or closed relative to the other housing. These variously classified portable communication apparatuses can be easily understood by those skilled in the art.

Conventional portable communication apparatuses now tend to transmit data at a high speed in addition to basic voice communication in response to increase in consumers' demand. To do so, portable communication apparatuses use a wireless communication technology capable of transmitting data at a high speed.

Newer portable communication apparatuses usually include a camera lens that enables a user to perform video communication with a desired partner or to photograph a desired subject.

To use the various functions in a portable apparatus, it is sometimes desirable to support the apparatus in an upright position. Such a conventional portable apparatus needs a separate stand to support the apparatus in an upright position for use. Alternatively, a separate charger is used as a stand when charging the apparatus.

However, it is uneconomical to have a separate stand and, when a separately provided charger is to be used to hold a portable apparatus in an upright position while charging it, it is problematic to carry the charger all the time. When a portable apparatus is retained and charged, in addition, the display device fixedly mounted on the main body of the portable apparatus can only be practically used as a phone.

The reason is that, when a portable apparatus is used to play games, to watch TV, or video, the display device must be rotated to provide the proper display orientation, and a wider display screen for convenient watching. When listening to music, stereo sound needs to be provided together with the wider display device. Consequently, it is desirable that a portable apparatus has a self-standing, or self-retaining function and a wider display device, provides stereo sound, and can be stably retained and maintain the retained state.

SUMMARY OF THE INVENTION

Accordingly, the present invention has been made to solve the above-mentioned problems occurring in the prior art, and an object of the present invention is to provide a sliding/swing-type portable apparatus having a self-standing, or self-retaining function.

Another object of the present invention is to provide a sliding/swing-type portable apparatus provided with a battery cover having a retaining function.

Another object of the present invention is to provide a sliding/swing-type portable apparatus having a battery cover rotatably connected thereto to provide a self-retaining function and a battery pack detachably and integrally provided on the battery cover so that the battery pack's own weight can provide stable retaining.

Another object of the present invention is to provide a sliding/swing-type portable apparatus capable of providing stereo sound in a video communication mode, a game mode, a video watching mode, a TV watching mode, or a music listening mode and providing a wider display device by means of a sliding/swing motion as a housing swings.

Another object of the present invention is to provide a sliding/swing-type portable apparatus capable of being retained in an upright position stably and easily, when a battery pack is used to retain it, and maintaining the retained state.

In order to accomplish these objects, there is provided a portable apparatus including a main body; a battery cover coupled to the bottom surface of the main body in a predetermined position so that it can rotate about a first hinge axis toward or away from the main body and provided with a folding force, at less than a first angle relative to the bottom surface of the main body, in such a direction that it is folded on the main body, an unfolding force at the first angle or more, and a retaining force at a second angle for retaining the main body with a slant on its own; and a battery pack attached to and detached from the battery cover.

In accordance with another aspect of the present invention, there is provided a portable apparatus including a main body; a sliding/swing housing adapted to be moved while continuously facing the upper surface of the main body; a first keypad composed of an array of a number of keys mounted on the upper surface of the main body and exposed or hidden according to whether the sliding/swing housing is slid or not; a pair of stereo speaker devices mounted on the upper surface of the main body and exposed or hidden according to whether the sliding/swing housing is swung or not; a microphone device mounted on the upper surface of the main body and exposed regardless of the sliding and swing movements of the sliding/swing housing; a battery cover coupled to the bottom surface of the main body in a predetermined position so that it can rotate about a first hinge axis toward or away from the main body and provided with a folding force, at less than a first angle relative to the bottom surface of the main body, in such a direction that it is folded on the main body, an unfolding force at the first angle or more, and a retaining force at a second angle for retaining the main body with a slant on its own; and a battery pack removably attached to the battery cover.

In accordance with another aspect of the present invention, there is provided a portable apparatus including a main body; a battery cover coupled to the lower end of the bottom surface of the main body in such a manner it can rotate about a hinge axis toward or away from the main body; a battery housing integrally provided on the inner surface of the battery cover in a box shape to be received on the bottom surface of the main body; a self-retaining means mounted on the bottom surface of the main body along a longitudinal direction to support the main body with a slant; and a battery pack removably attached to the battery housing.

In accordance with another aspect of the present invention, there is provided a portable apparatus including a main body; a sliding/swing housing adapted to be moved while continuously facing the upper surface of the main body; a speaker device mounted on the upper surface of the main body and exposed or hidden according to whether the sliding/swing housing is swung or not; a battery pack coupled to the bottom surface of the main body in a predetermined position so that it can rotate about a first hinge axis and provided with a folding force at less than a first angle in such a direction that it is folded on the main body, an unfolding force at the first angle or more, and a retaining force at a second angle for retaining the main body with a slant on its own; and a first holding device positioned between the battery pack and the bottom surface of the main body to easily maintain the seating position of the battery pack during seating.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein is omitted to avoid making the subject matter of the present invention unclear.

Figure 1:
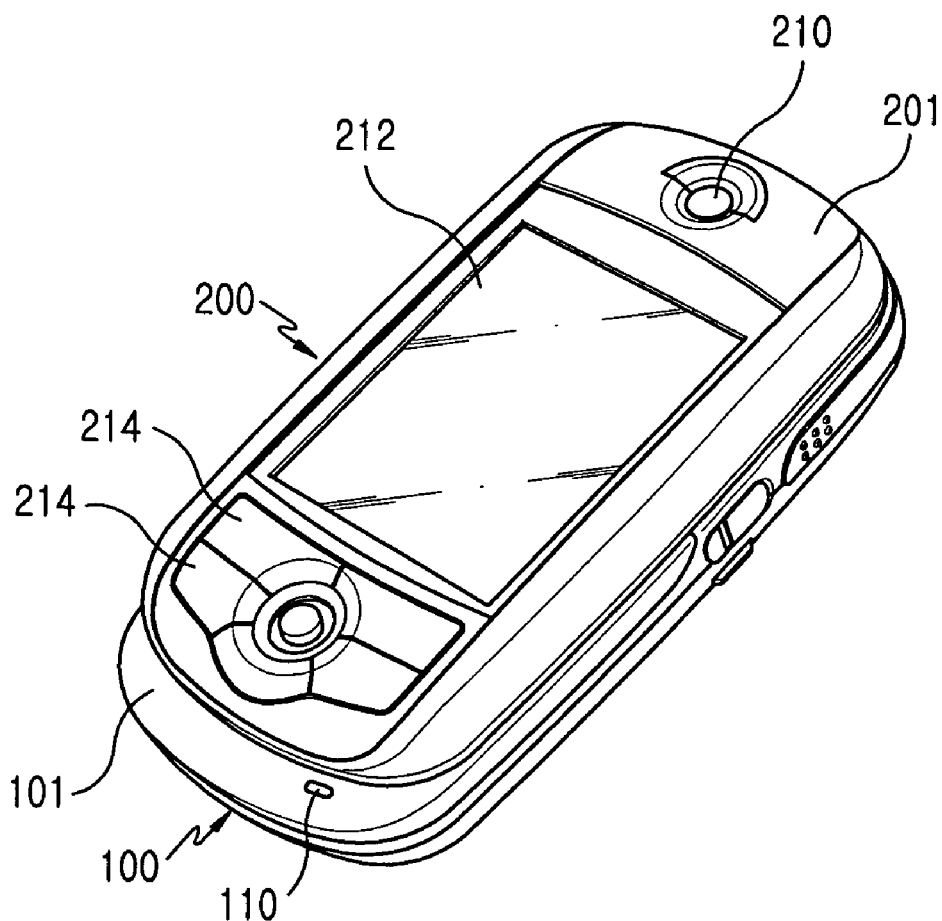
FIG. 1 is a perspective view illustrating a sliding/swing-type portable apparatus according to a first embodiment of the present invention.
Figure 2:
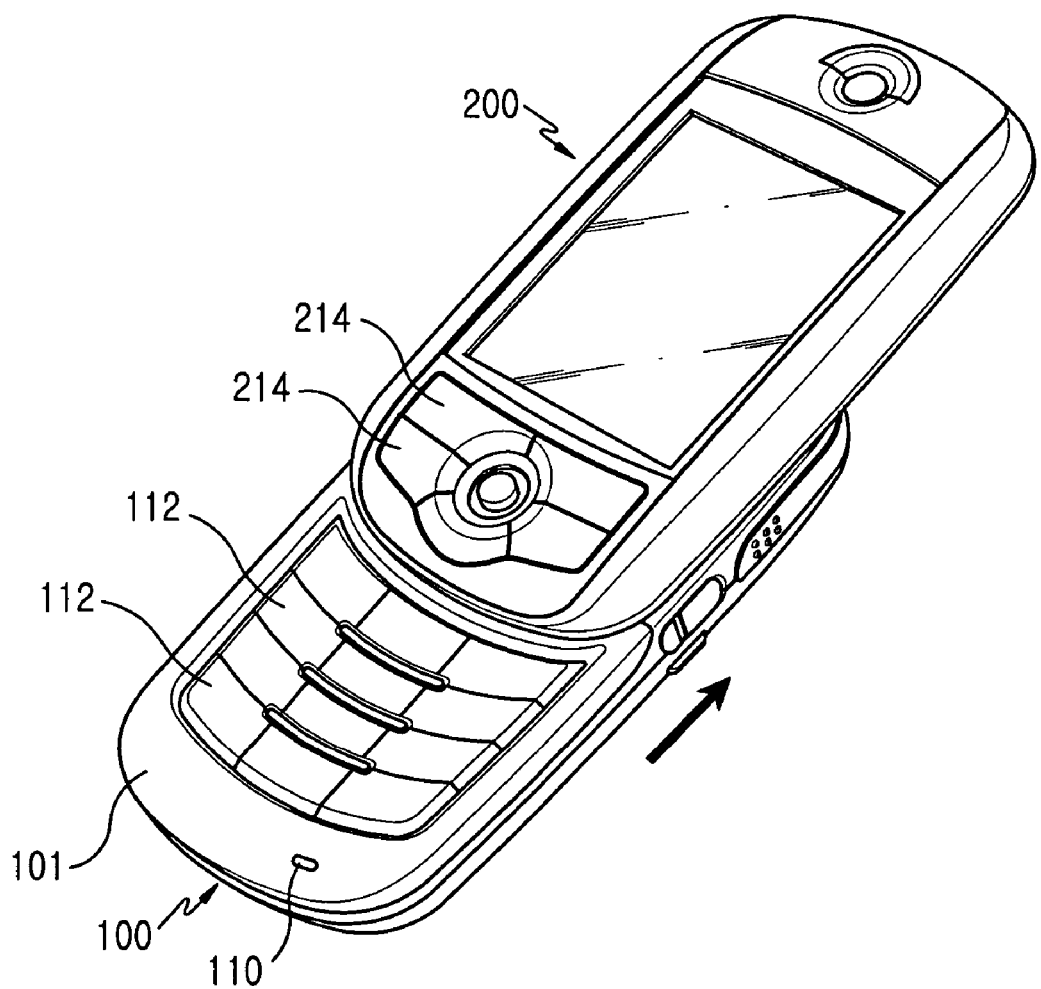
FIG. 2 is a perspective view illustrating the sliding/swing-type portable apparatus of FIG. 1 after full sliding
Figure 3:
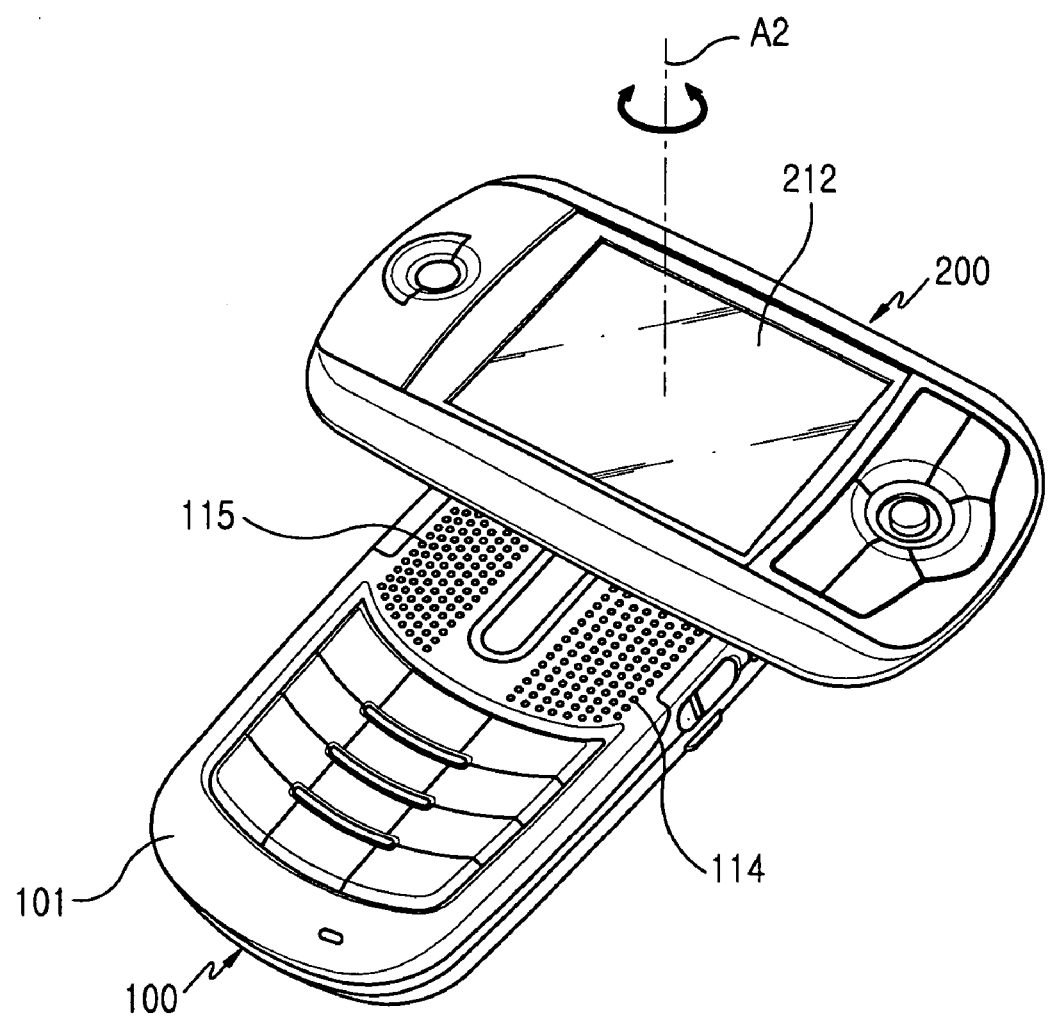
FIG. 3 is a perspective view illustrating the sliding/swing-type portable apparatus of FIG. 1 after full swing.

As shown in FIGS. 1 to 5, a portable apparatus according to the present invention includes a main body 100; a battery cover 300 (shown in FIG. 4) rotatably connected to the bottom surface 102 (shown in FIG. 4) of the main body 100 to retain the main body 100 in an upright, slanted position, in a free-standing configuration on its own; a battery pack 400 (shown in FIG. 5) attached to and detached from the battery cover 300; and a sliding/swing housing 200 adapted to slide while being parallel to and continuously facing the upper surface 101 of the main body 100, as well as to swing about a second hinge axis A2 (shown in FIG. 3).

The battery cover 300 and the battery pack 400 will be described later in more detail.

As shown in FIG. 1, the main body 100 and the sliding/swing housing 200 have different lengths. Specifically, the main body 100 is longer than the sliding/swing housing 200. The main body 100 has a microphone device 110 positioned on a corner of a lower end thereof, that is not hidden by the sliding/swing housing 200 but is exposed regardless of the sliding and swing movements of the sliding/swing housing 200.

The sliding/swing housing 200 has, on its upper surface 201, a single key 210, a display device 212 adjacent to the single key 210, and a second keypad 214 composed of an array of a number of keys adjacent to the display device 212.

FIG. 2 is a perspective view illustrating a state wherein the sliding/swing housing 200 is fully slid on the upper surface 101 of the main body 100 in the longitudinal direction. As shown in FIG. 2, the main body 100 has a first keypad 112 composed of an array of a number of keys positioned on the upper surface 101 thereof. The first keypad 112 is preferably arranged in 3×4 array and is adjacent to the microphone device 110. The first keypad 112 is exposed or hidden according to whether the sliding/swing housing 200 is slid or not. Particularly, the first keypad 112 is hidden when the sliding/swing housing 200 is folded on the main body 100 and is fully exposed when the sliding/swing housing 200 is fully unfolded from the main body 100. The first and second keypads 112 and 214 are adjacent to each other, in a state as shown in FIG. 2, and are continuously grouped together.

FIG. 3 is a perspective view illustrating a state wherein the sliding/swing housing 200 is fully swung from a position shown in FIG. 2. As shown in FIG. 3, the main body 100 has a pair of stereo speaker devices 114 and 115 positioned on the upper surface 101 thereof in a predetermined position to provide stereo sound. The pair of stereo speaker devices 114 and 115 are exposed or hidden according to whether the sliding/swing housing 200 is swung open or not. Particularly, the pair of stereo speaker devices 114 and 115 are hidden (shown in FIG. 2) when the sliding/swing housing 200 is not swung open from the upper surface 101 of the main body 100 and are fully exposed when the sliding/swing housing 200 is fully swung open from the upper surface 101 of the main body 100. The display device 212 is adjacent to the pair of stereo speaker devices 114 and 115 in a position as shown in FIG. 3. The pair of stereo speaker devices 114 and 115 emit stereo sound in a direction perpendicular to the upper surface 101 of the main body 100.

Figure 4:
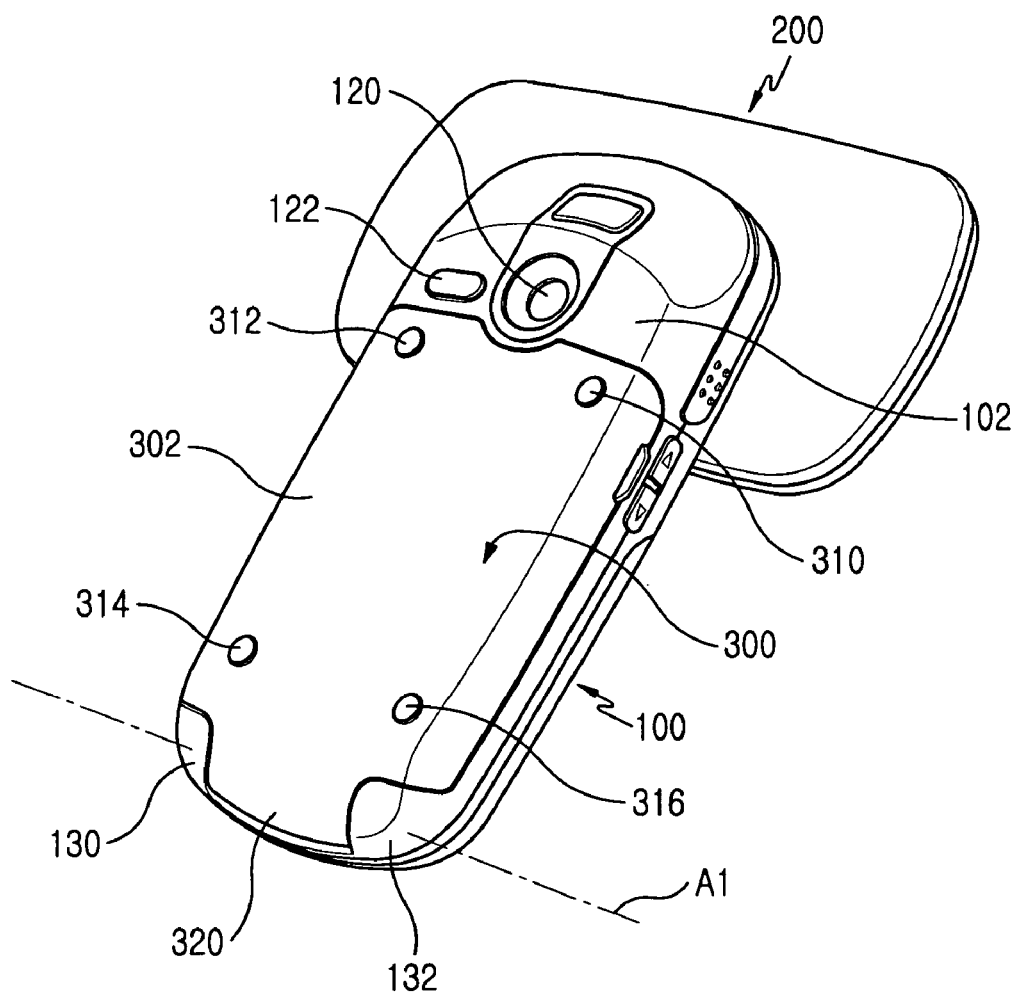
FIG. 4 is a perspective view illustrating the bottom surface of the sliding/swing-type portable apparatus shown in FIG. 3.

As shown in FIG. 4, the main body 100 has on its bottom surface 102 a battery cover 300, including a battery pack 400 (shown in FIG. 5), adapted to rotate about a first hinge axis A1. The bottom surface 102 of the main body 100 is provided with a camera lens 120 and a lighting device 122 adjacent to the camera lens 120. The battery cover 300 has at least one rubber member 310, 312, 314, and 316 positioned on the outer surface 302 thereof, and preferably has four rubber members positioned near four corners of the outer surface 302. The main body 100 has a hinge device positioned along the lower end of the bottom surface 102 to provide the first hinge axis A1. The hinge device connects the main body 100 and the battery cover 300 to each other in such a manner that they can rotate about the first hinge axis A1. The hinge device includes a pair of side hinge arms 130 and 132 formed on both corners of the lower end of the bottom surface 102 of the main body 100, respectively, and a center hinge arm 320 formed on the lower end of the battery cover 300 with both ends thereof coupled to the pair of side hinge arms 130 and 132 by a hinge module (not shown), respectively.

Figure 5:
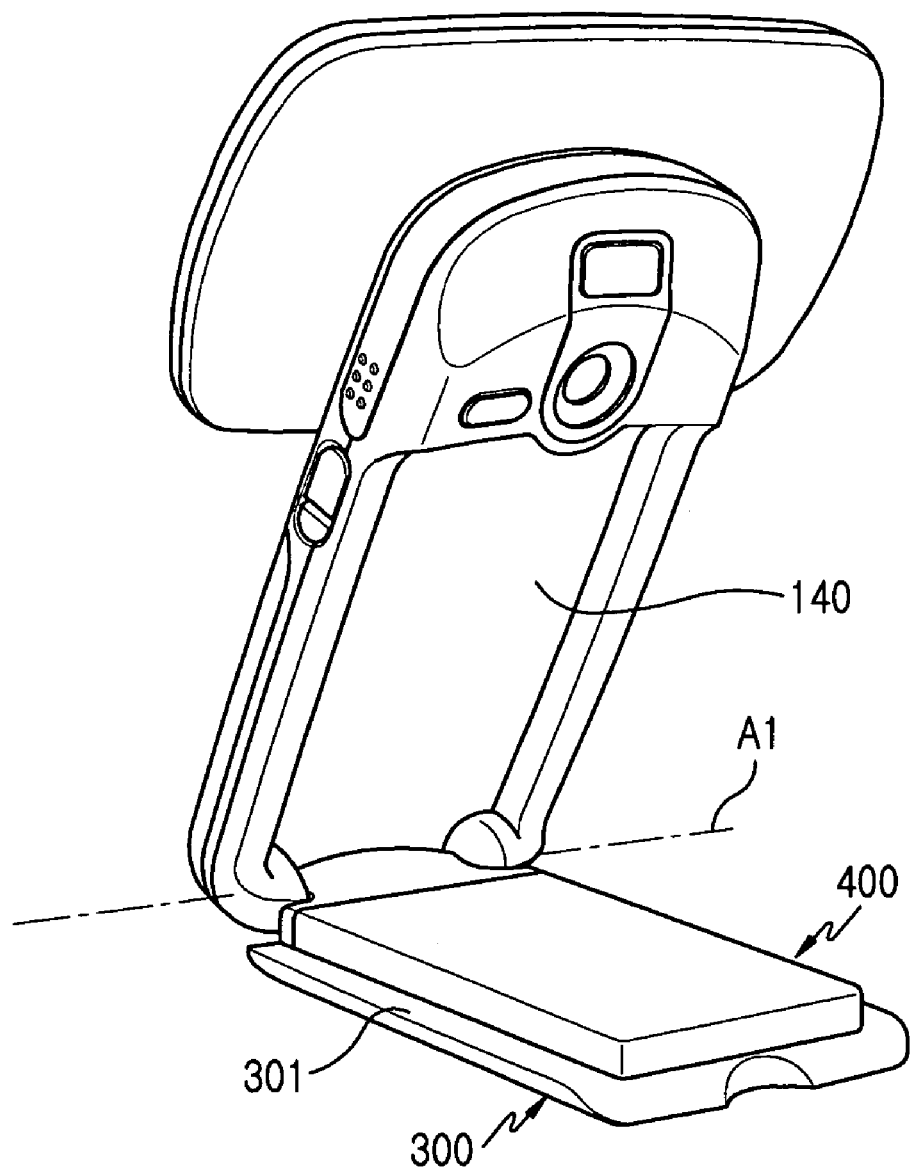
FIG. 5 is a perspective view illustrating the sliding/swing-type portable apparatus of FIG. 1 in a retained state.
Figure 6:
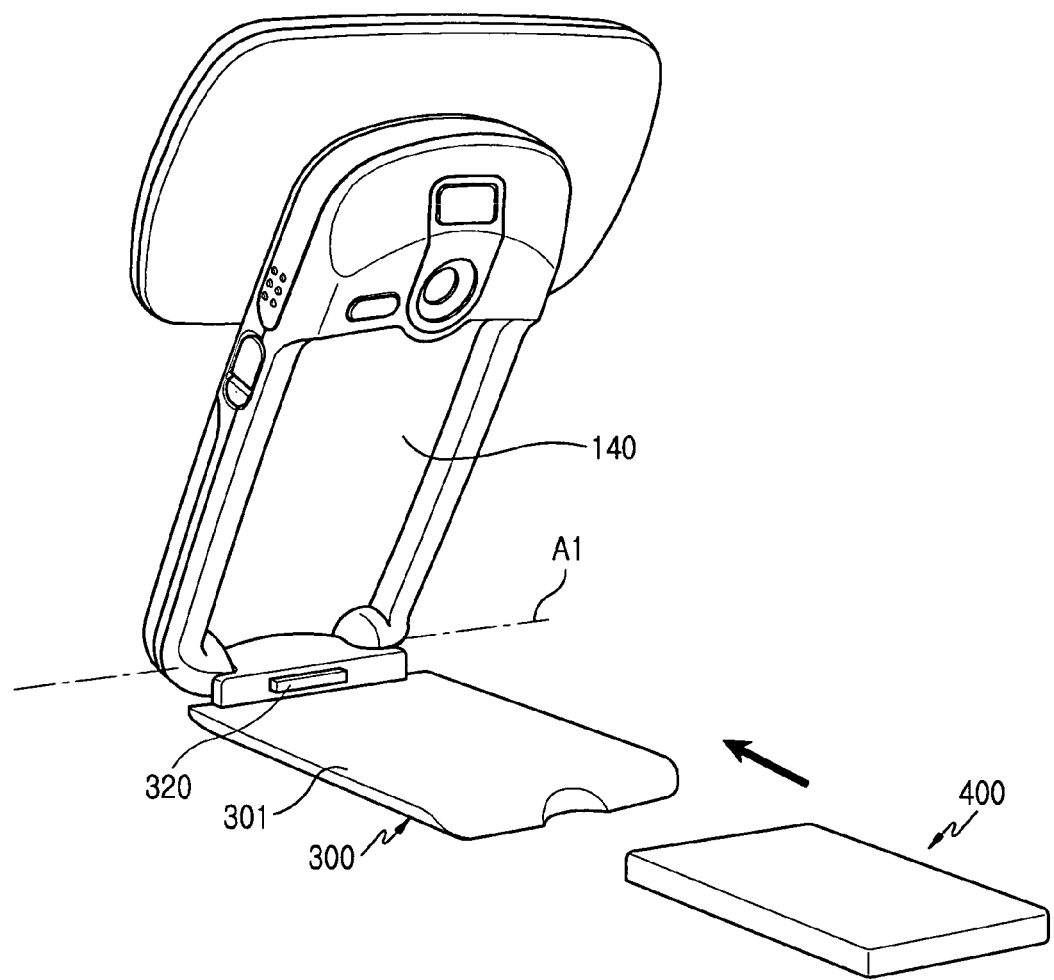
FIG. 6 is a perspective view illustrating the sliding/swing-type portable apparatus of FIG. 1 with its battery cell separated.

As shown in FIGS. 5 and 6, the main body 100 has a rectangular slot 140 formed on the bottom surface 102 thereof to receive the battery cover 300 including the battery pack 400. The battery pack 400 is attached to and detached from the inner surface 301 of the battery cover 300 and includes a number of battery cells. The battery cover 300 has a connection unit 320 positioned on a lateral wall of a stepped portion of the inner surface 301 thereof. The battery pack 400 is attached to and detached from the connection unit 320. Preferably, the battery pack 400 is moved along the inner surface 301 of the battery cover 300 to be attached and detached. The battery pack 400 is mounted or separated by a user's manual force.

Particularly, the battery pack 400 is mounted as follows: the battery pack 400 is placed on the inner surface 301 of the battery cover 300 and is manually pushed toward the connection unit 320 of the battery cover 300 along the inner surface 301, so that another connection unit (not shown) of the battery pack 400 is connected to the connection unit 320 of the battery cover 300. The connection unit 320 of the battery cover 300 may be of a male type and the connection unit (not shown) of the battery pack 400 may be of a female type, and vice-versa.

When connected to and mounted on the battery cover 300, the battery pack 400 can integrally rotate together with the battery cover 300 and is safely received in the slot 140.

Figure 7:
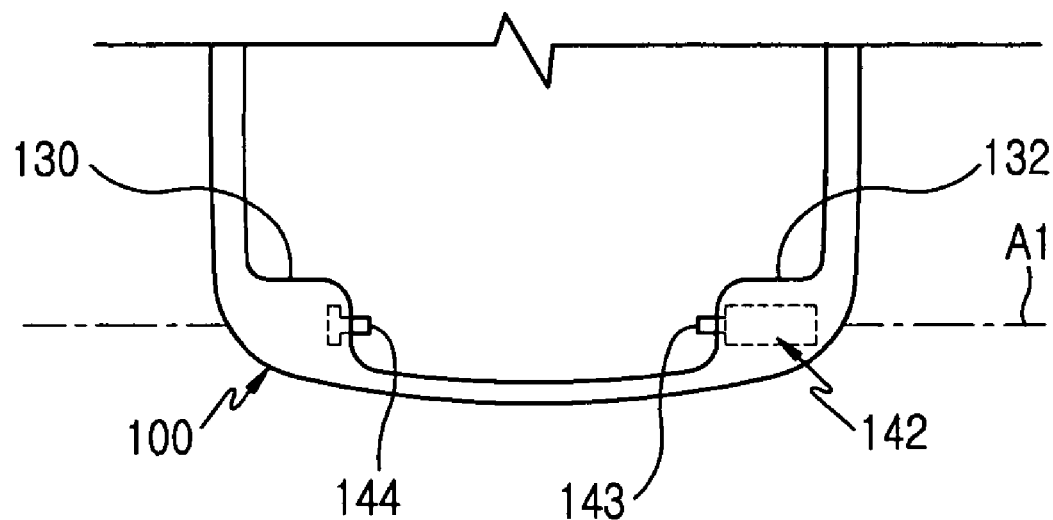
FIG. 7 is a front view illustrating the lower end of the bottom surface of the main body of the sliding/swing-type portable apparatus of FIG. 1.

As shown in FIG. 7, the hinge module 142 provides the first hinge axis A1 and includes a conventional hinge housing, a hinge shaft 143, a hinge cam, and a hinge spring. The construction of the hinge module 142 will be easily understood by those skilled in the art. FIG. 7 shows only a shaft portion 144 of a hinge dummy and the hinge shaft 143 of the hinge module. The hinge module 140 provides a folding force, at less than a first angle, in such a direction that the battery cover 300 is moved towards the bottom surface 102 of the main body 100; an unfolding force, at the first angle and greater, in such a direction that the battery cover 300 is moved away from the bottom surface 102; and a retaining force, at a second angle, to retain the battery cover 300 at a retaining angle. As such, the battery cover 300 is provided with a force from the hinge module 142 that retains the main body 100 in an upright, angled, or slanted position.

The hinge module 142 is mounted on one of the side hinge arms 132 and the hinge dummy 144 corresponding to the hinge module 142 is mounted on the other side hinge arm 132. A flexible circuit (not shown) extends through the hinge dummy. The hinge module 142 or the hinge dummy 144 may be mounted on the center hinge arm.

FIG. 2 shows the portable apparatus used as a phone in a phone mode and FIG. 3 shows the apparatus in the configuration used to play games in a game mode, watch TV in a TV watching mode, watch video in a VOD (Video on Demand) mode, or listen to music in a music listening mode. FIG. 5 shows the portable apparatus retained in an upright, slanted position using the battery cover 300.

As shown in FIG. 5, the battery pack may be integral with the battery cover and provides retaining stability, due to its own weight, in a state as shown in FIG. 5.

As shown in FIGS. 3 and 4, the first hinge axis A1 is spaced from and perpendicular to the second hinge axis A2. The sliding direction of the sliding/swing housing 200 is perpendicular to the first hinge axis A1, as well as to the second hinge axis A2.

Figure 8:
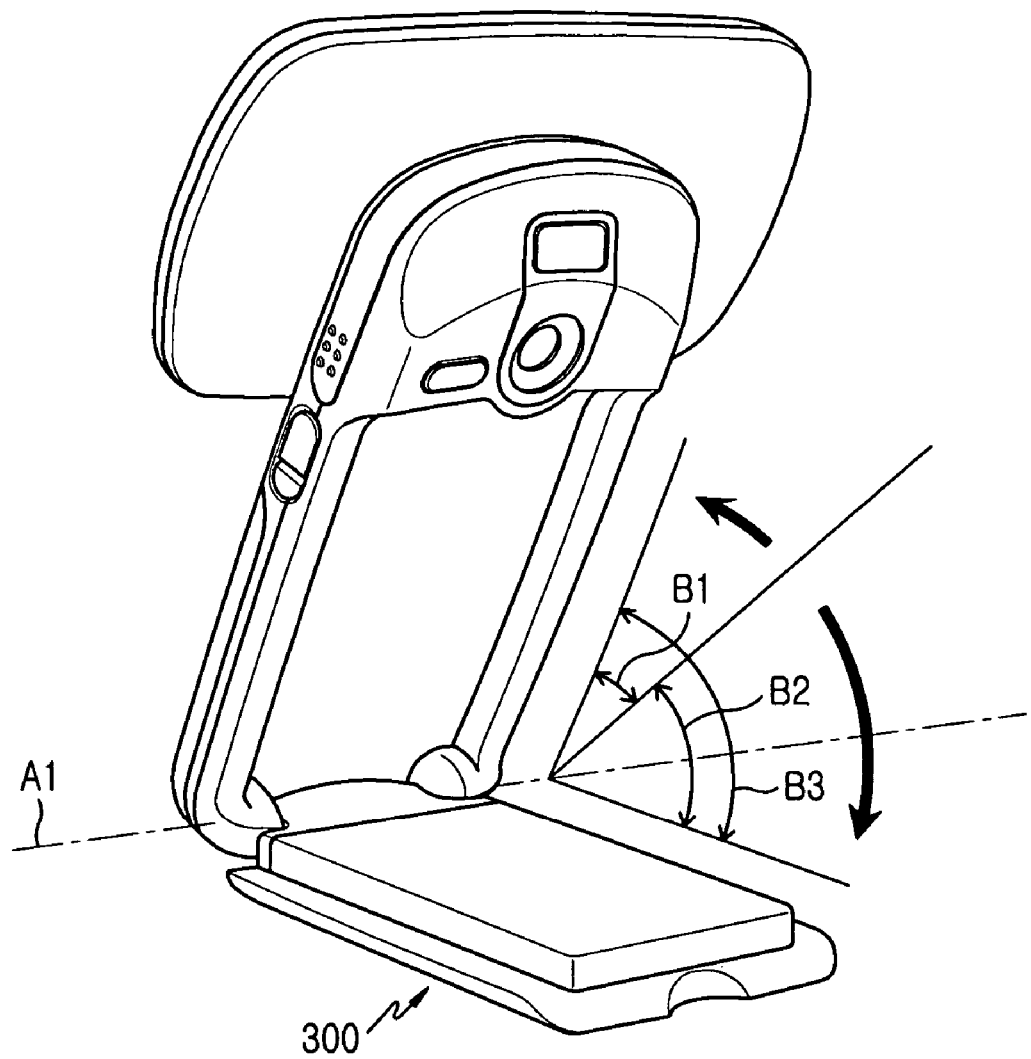
FIG. 8 shows an example of a folding/unfolding force applied to a battery cover, depending on a rotation angle, according to the first embodiment of the present invention.

As shown in FIG. 8, the hinge module provides the battery cover 300 with a folding force at the first angle $\theta_1$ or less, an unfolding force from the first angle to the second angle $\theta_2$, and a retaining force at the second angle $\theta_3$ (i.e., retaining angle).

The battery cover 300 has dual functions of protecting the battery pack 400 and acting as a base stand for retaining the main body. The battery pack 400 has dual functions of providing the main body with power and providing weight at the base of the upright position, thereby also providing retaining stability by being integral with the battery cover 300 in a detachable manner.

FIGS. 9 to 12b show a sliding/swing-type portable apparatus according to a second embodiment of the present invention. In the following description of the portable apparatus according to the second embodiment, some of the same components that are in the first embodiment will be omitted for clarity.

Figure 9:
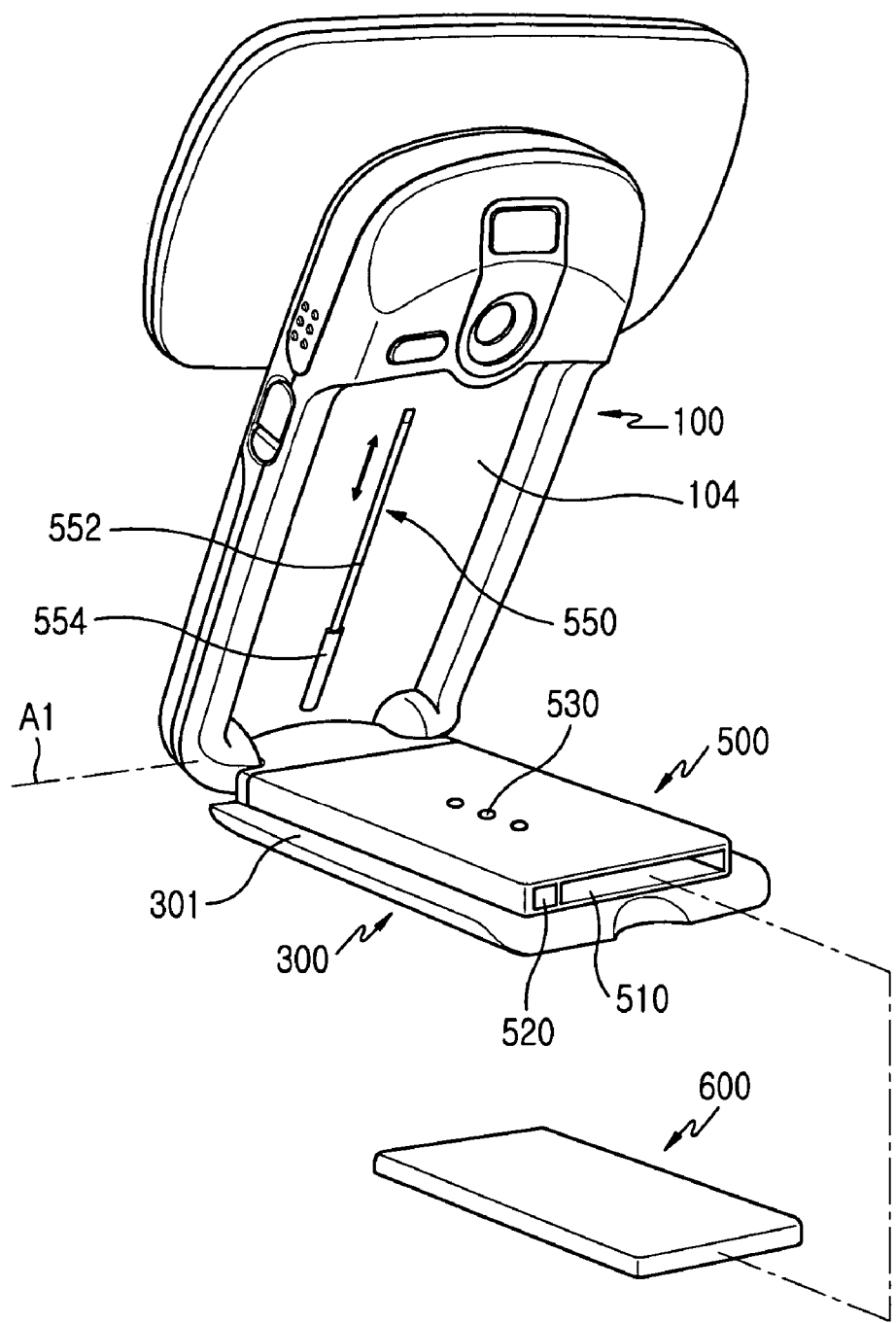
FIG. 9 is a perspective view illustrating a sliding/swing-type portable apparatus having a self-retaining function according to a second embodiment of the present invention.
Figure 10:
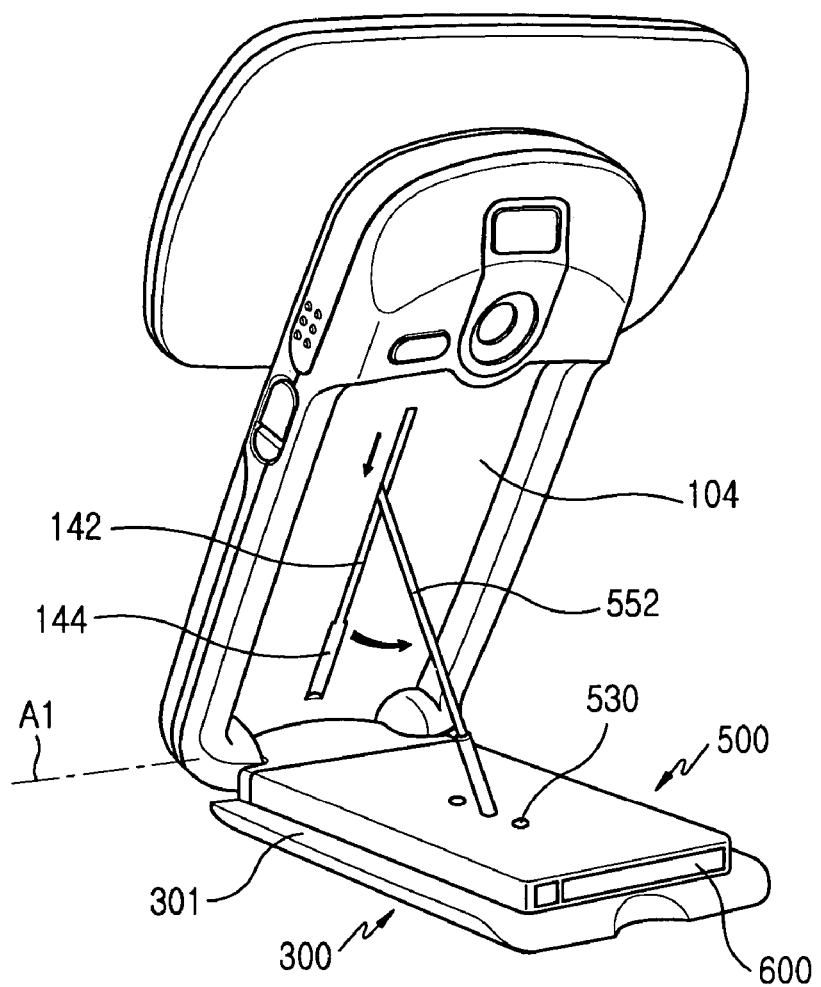
FIG. 10 is a perspective view of the sliding/swing-type portable apparatus in FIG. 9.

As shown in FIGS. 9 and 10, a portable apparatus according to a second embodiment of the present invention includes a main body 100; a battery cover 300 connected to the lower end of the bottom surface 104 of the main body 100 in such a direction that it can rotate about a hinge axis A1 toward or away from the main body 100; a battery housing 500 integrally formed on the inner surface 301 of the battery cover 300 in a box shape to be received on the bottom surface 104 of the main body 100; a self-retaining means 550 mounted on the bottom surface 104 of the main body 100 along the longitudinal direction to support the main body 100 at a slant; and a battery pack 600 attached to and detached from the battery housing 500. In FIG. 9, a rod-type member 552 (described later) is shown to be received in a reception groove in FIG. 9 and, in FIG. 10, is shown to provide support between the main body 100 and the battery housing 550. The battery housing 550 has a number of retaining grooves 530 formed on the outer surface thereof in a linear arrangement.

The main body 100 has reception grooves formed on the bottom surface 104 thereof to receive the rod-type member 552, including a first reception groove 142 and a second reception groove 144 continuously connected to the first reception groove 142 while having different width and depth. The first reception groove 142 receives the upper portion of the rod-type member 552 and the second reception groove 144 receives the lower portion and the rubber portion 554 of the rod-type member 552.

An end of the rod-type member 552 is slid in the first reception groove 142 along the longitudinal direction by a manual force from the user and the other end of the rod-type member 552, i.e., the rubber portion 554, is coupled to any one of the retaining grooves 530 and is supported therein.

Preferably, the battery pack 600 includes a number of conventional battery cells and is attached to and detached from a slot 510 provided on the battery housing. A detachment button 520 is positioned adjacent to the slot 510 to detach the battery pack 600. As the detachment button 520 is pressed, the battery pack 600 is detached from the slot 510.

Figure 11:
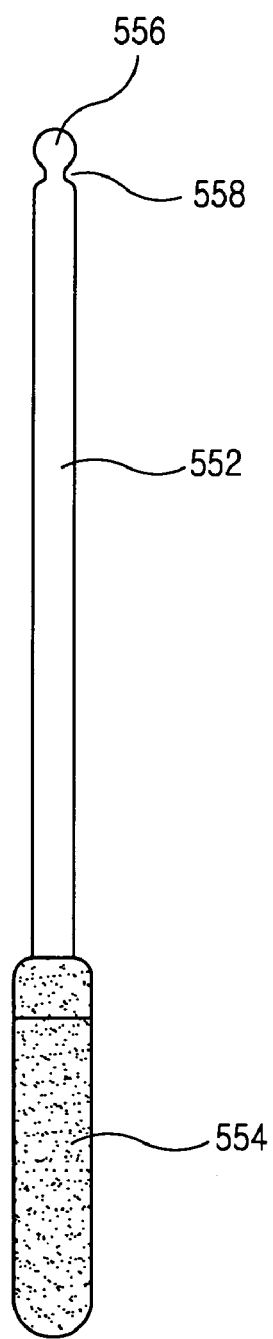
FIG. 11 is a front view illustrating a rod-type member according to a second embodiment of the present invention.

As shown in FIG. 11, an end of the rod-type member 552 has a spherical portion 556 at one end so that it can rotate in both horizontal and vertical directions while being coupled to the first reception groove; and the other end thereof is configured as a rubber portion 554 for maximized friction force. Preferably, the spherical portion 556 has a neck portion 558 to be stably constrained in the first reception groove and slide along the longitudinal direction of the first reception groove.

Figure 12A:
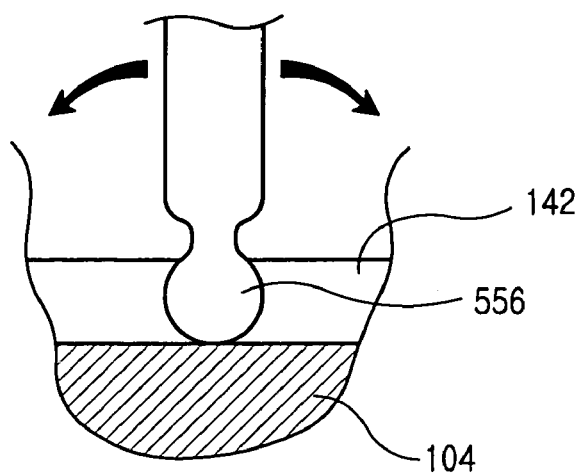
FIG. 12A is a partially-broken longitudinal sectional view of the rod-type member in FIG. 11.
Figure 12B:
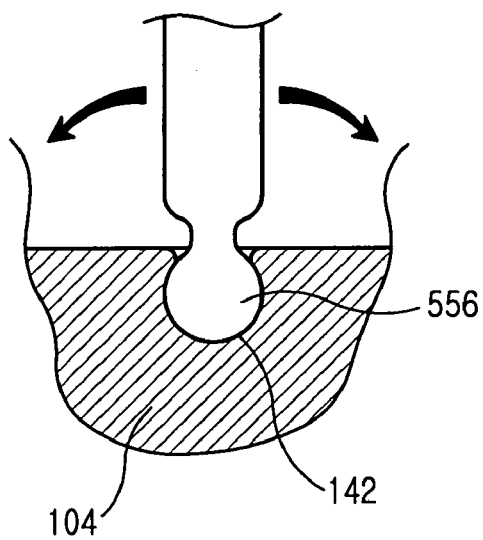
FIG. 12B is a partially-broken traverse sectional view of the rod-type member in FIG. 12B in a coupled state.
Figure 13:
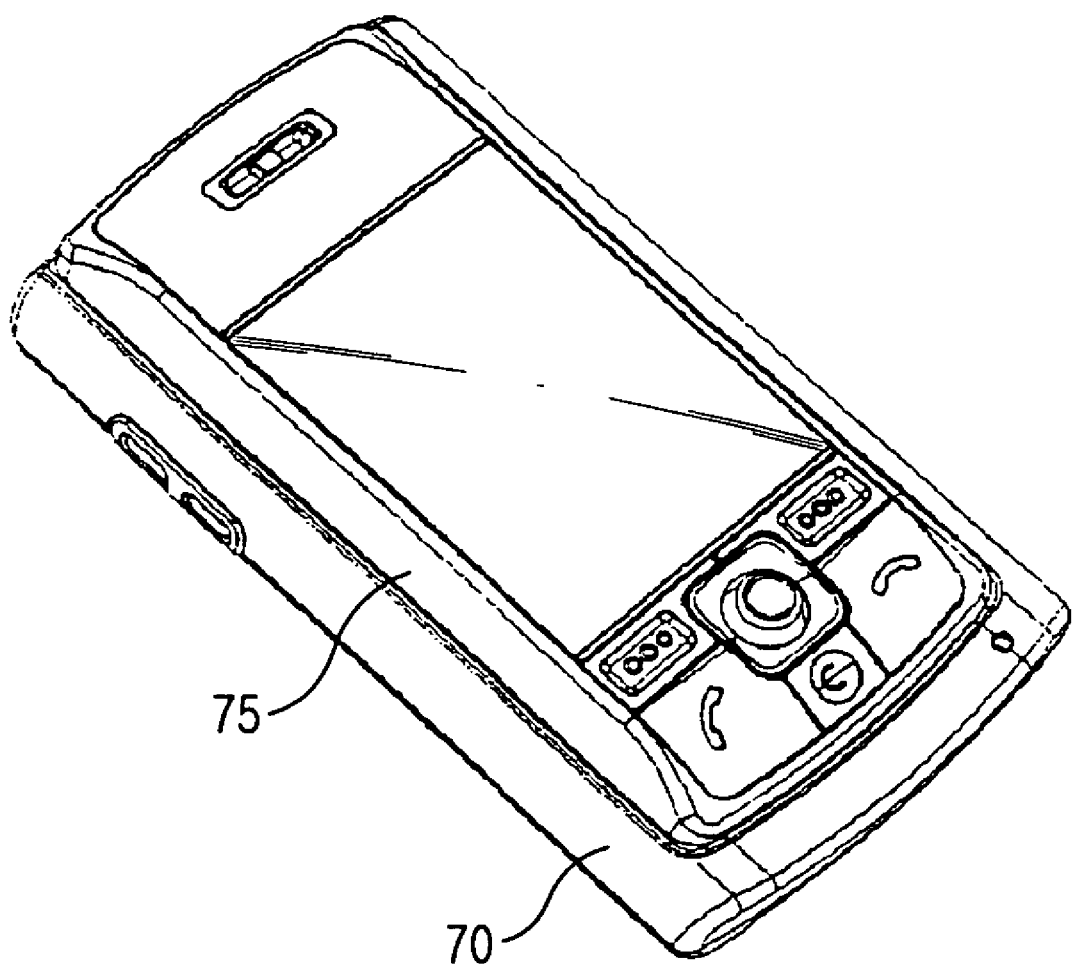
FIG. 13 is a perspective view illustrating a sliding/swing-type portable apparatus having a self-retaining function according to a third embodiment of the present invention.
Figure 14:
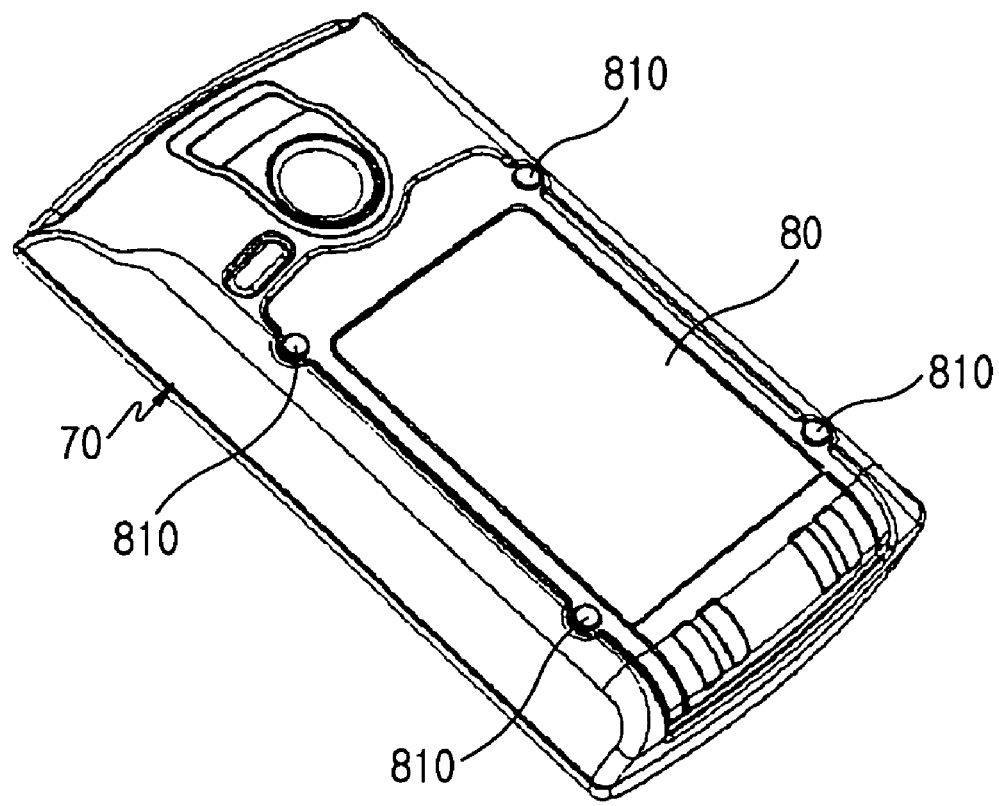
FIG. 14 is a perspective view of the bottom surface of the sliding/swing-type portable apparatus shown in FIG. 13.

As shown in FIGS. 12A and 12B, an end of the rod-type member configured as a spherical portion 556 is coupled to the first reception groove 142 and can rotate in both horizontal and vertical directions. Particularly, the spherical portion 556 is slid along the longitudinal direction of the first reception groove 142 when a manual force is applied to the rod-type member 552 from the user and remains stationary as long as no force is applied.

The rod-type member is not necessarily mounted on the bottom surface of the main body of the inventive portable apparatus. It is to be noted that, alternatively, the rod-type member may be mounted on the battery housing and the retaining grooves may be formed on the bottom surface of the main body.

A portable apparatus according to a third embodiment of the present invention will now be described with reference to FIGS. 13 to 17. The portable apparatus includes a main body 70, a sliding/swing housing 75 adapted to be moved while continuously facing the upper surface of the main body 70, and a battery pack 80 connected to the bottom surface 702 of the main body 70 in such a manner that it can rotate about a hinge axis A. A hinge module (not shown) provides the battery pack 80 with a folding force, at less than a first angle, in such a direction that it is folded on the bottom surface 702 of the main body 70; an unfolding force, at the first angle or more, in such a direction that it is unfolded from the bottom surface 702 of the main body 70; and a retaining force, at a second angle, in such a manner that it retains the main body 70 in an upright position, at an angle, or slant, while being free-standing. The hinge module (not shown) may include a conventional hinge shaft, a hinge cam, and a hinge spring. The battery pack 80 is electrically connected to the main body 70 via a flexible circuit (not shown) extending through the hinge axis A. The flexible circuit (not shown) is connected to a main board (not shown) contained in the main body by way of the hinge axis.

Figure 15:
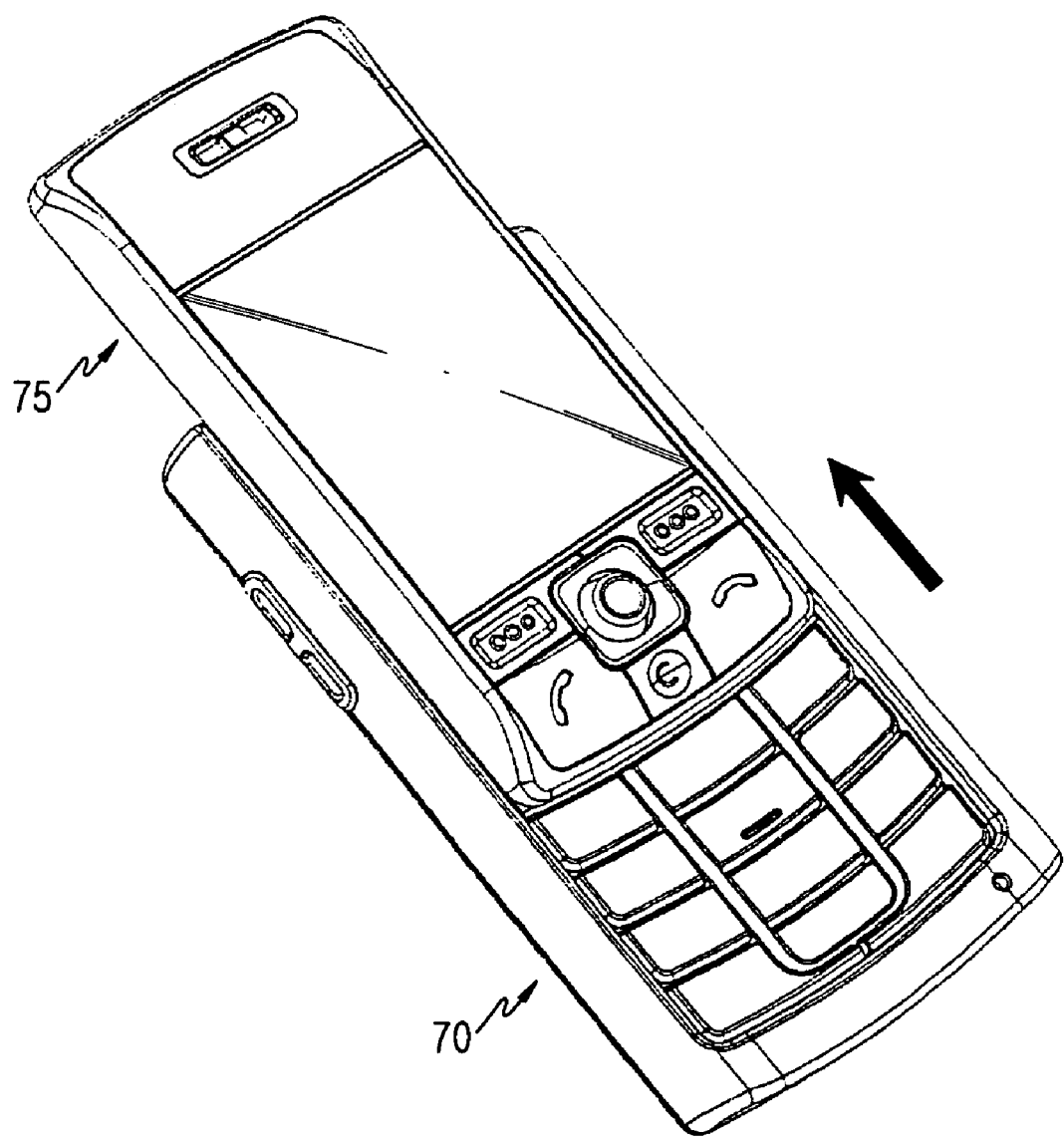
FIG. 15 is a perspective view of the sliding/swing-type portable apparatus in FIG. 14 after sliding of its sliding housing.
Figure 16:
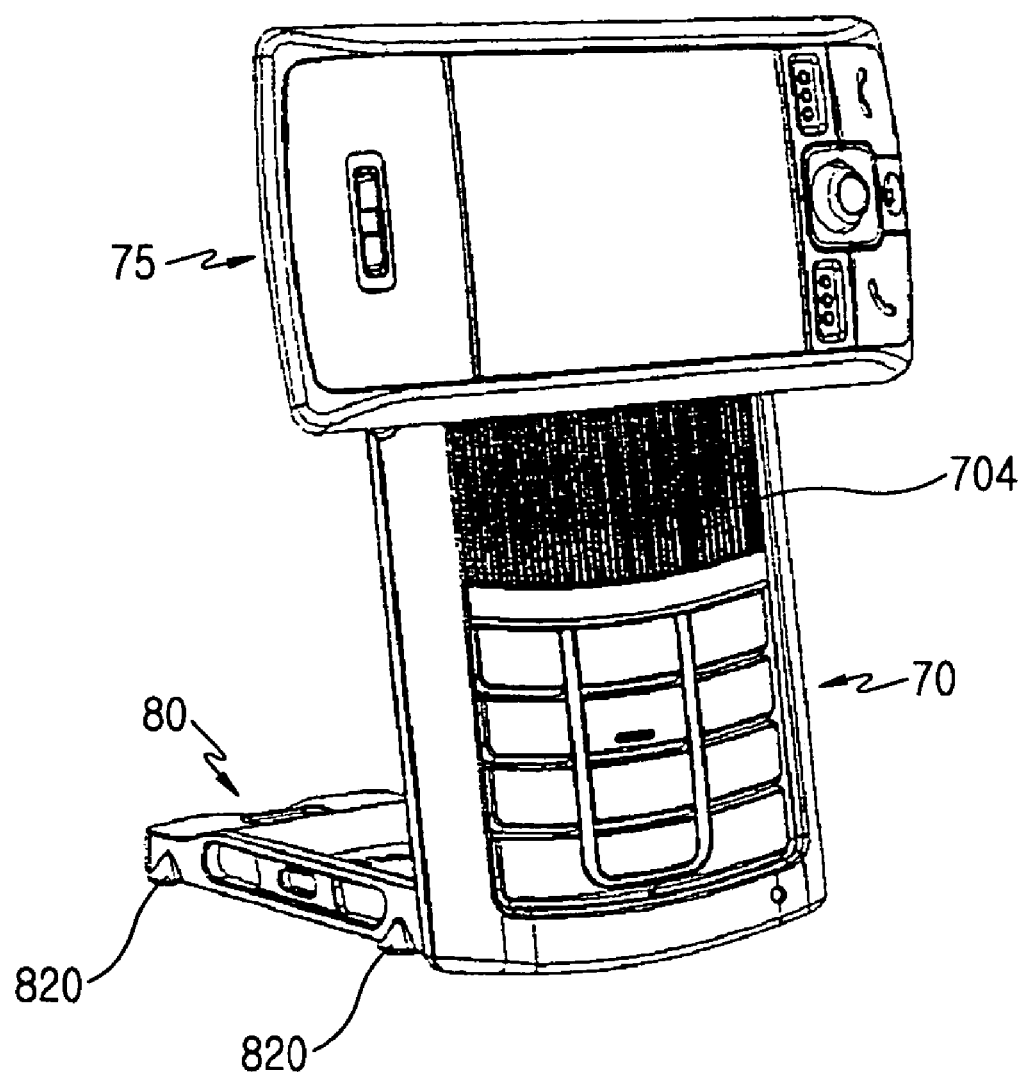
FIG. 16 is a perspective view of the sliding/swing-type portable apparatus of FIG. 3, which is self-retained after swing of its sliding/swing housing and rotation of its battery pack.
Figure 17:
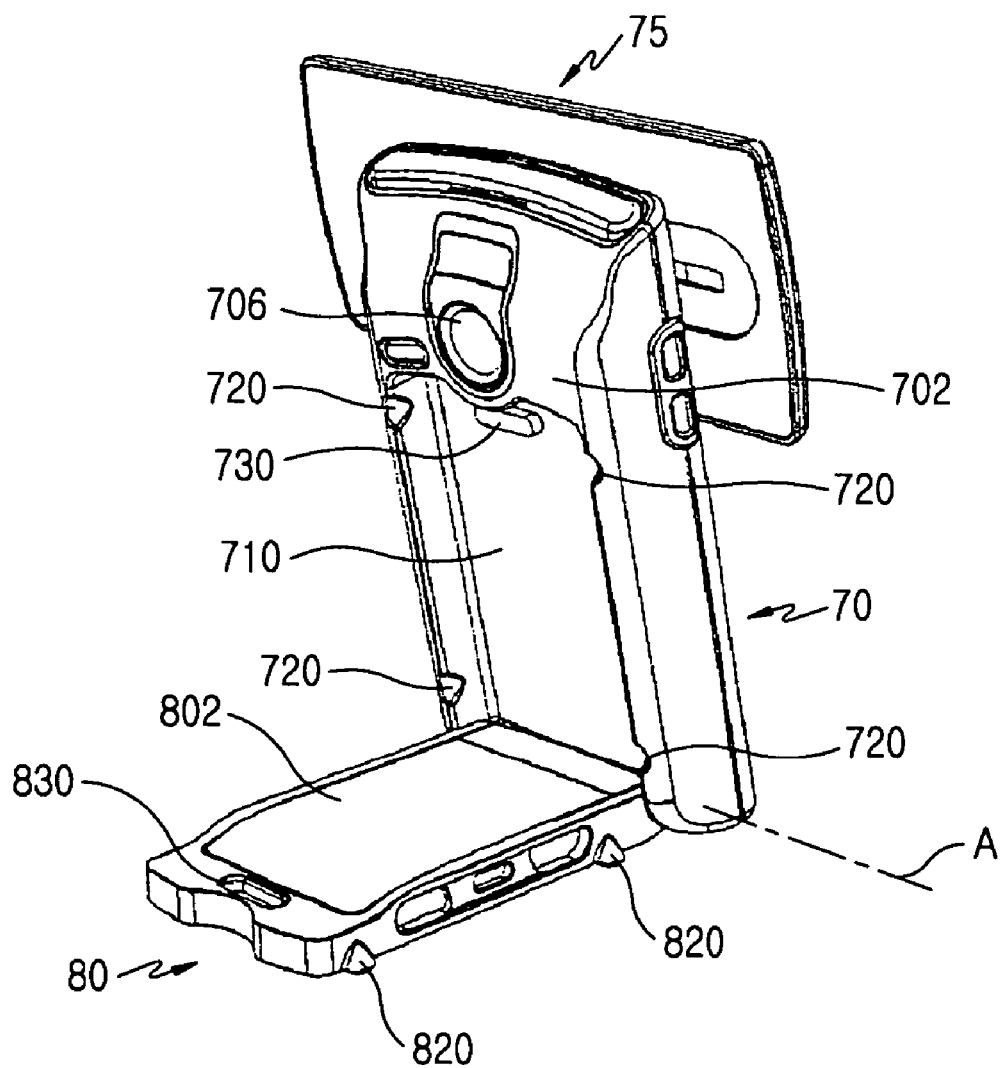
FIG. 17 is a perspective view from behind the sliding/swing-type portable apparatus of FIG. 16.

FIG. 17 shows a state wherein the battery pack 80 is provided with a retaining force and retains the main body 70 in an upright position at a slant. FIG. 15 shows the sliding/swing housing 75 after full sliding. FIG. 16 shows a state wherein, after the sliding, the sliding/swing housing 75 is rotated about 90° and the battery pack 80 is rotated and supports the main body 70 in the upright, slanted, or angled position.

As shown in FIG. 16, the main body 70 has a speaker device 704 positioned on the upper surface thereof, which is exposed or hidden according to whether the sliding/swing housing 75 is swung or not. Particularly, the speaker device 704 is exposed and emits stereo sound when the sliding/swing housing 75 is slid a predetermined distance and swung a predetermined angle. In a state as shown in FIG. 16, therefore, the user can watch the display device while being oriented in the horizontal direction and is provided with stereo sound. This is convenient for watching various motion video media, including TV and video programs.

As shown in FIGS. 16 and 17, at least one holding device is positioned between the bottom surface 702 of the main body and the battery pack 80 to safely maintain the seating position of the battery pack. The holding devices include a first holding device and a second holding device disposed adjacent to the first holding device. The first holding device includes at least one holding protrusion 820 positioned on the lateral end of the battery pack 80 and a holding opening 720 positioned on the bottom surface 702 of the main body to be coupled to the holding protrusion 820. Particularly, at least one pair of holding protrusions 820 protrude from both lateral ends of the battery pack away from it, respectively. Two pairs of holding protrusions 820 (i.e., a total of four) are shown in FIGS. 16 and 17. The holding opening 720 is formed on a reception space 710 of the bottom surface of the main body in a shape corresponding to the holding protrusions 820.

Preferably, the holding protrusions 820 have a semi-conical shape so that the battery pack 80 can be smoothly seated in the reception space 710 of the bottom surface of the main body. The holding protrusions 820 do not necessarily have a semi-conical shape and may have a semi-spherical or semi-cylindrical shape.

The second holding device is positioned between the bottom surface 702 of the main body, particularly the bottom of the reception space 710, and the battery pack 80 to support the received battery pack 80. The second holding device includes a groove 830 formed on the upper surface 802 of the battery pack and a protrusion 730 formed on the bottom of the reception space 710 of the main body to be coupled to the groove. The battery pack 80 stably remains in a received state as the protrusion 730 and the groove 830 are coupled to each other.

As shown in FIG. 17, the main body has a camera lens 706 positioned on the bottom surface thereof.

In summary, the inventive portable apparatus can be self-supported using the battery pack. Particularly, the first and second holding devices realize easy holding operation and stably maintain the holding state.

As mentioned above, the portable apparatus according to the present invention is convenient and has economic advantages in a standing mode, since the main body can be self-supported at a slant by the rotatable battery, that provides stability in the upright position, since the battery pack can be attached to and detached from the battery cover. The sliding/swing housing provides stereo sound in a video communication mode or a game mode for improved audio. In addition, the inventive portable apparatus has two holding devices for retaining the apparatus in the upright position in a stable manner.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable apparatus comprising:
   a main body;
   a battery cover coupled to a bottom surface of the main body in a predetermined position so that it can rotate about a first hinge axis toward or away from the main body and provided with a folding force, at less than a first angle relative to the bottom surface of the main body, in such a direction that it is folded on the main body, an unfolding force at between the first angle and a second angle, the second angle being greater than the first angle, and a retaining force at the second angle for retaining the main body in an upright position at a slant;
   a sliding/swing housing positioned on an upper surface of the main body, the sliding/swing housing adapted to slide along a longitudinal direction of the main body while being parallel to and continuously facing the main body and adapted to swing about a second hinge axis, which is spaced from and perpendicular to the first hinge axis and which is perpendicular to the longitudinal direction, while being parallel to and continuously facing the inner surface, the inner surface being opposite to the bottom surface; and
   a battery pack removably attached to the battery cover.

2. The portable apparatus as claimed in claim 1, wherein the main body has a slot formed on the bottom surface thereof to receive the battery pack.

3. The portable apparatus as claimed in claim 1, further comprising a hinge device positioned along a lower end of the bottom surface of the main body to rotatably connect the main body and the battery cover to each other.

4. The portable apparatus as claimed in claim 3, wherein the hinge device comprises:
   a pair of side hinge arms formed on both corners of an outer periphery of the bottom surface of the main body, and
   a center arm formed on the battery cover with both ends thereof being coupled between the pair of side hinge arms.

5. The portable apparatus as claimed in claim 1, wherein the battery cover has a connection unit for connection to the battery pack and the battery pack is adapted to be moved along the inner surface of the battery cover to be attached to and detached from the connection unit.

6. The portable apparatus as claimed in claim 1, wherein the second angle is a retaining angle and is smaller than 90°.

7. The portable apparatus as claimed in claim 1, wherein the battery cover has at least one rubber member positioned on an outer surface thereof.

8. The portable apparatus as claimed in claim 1, wherein the main body is longer than the sliding/swing housing in the longitudinal direction.

9. The portable apparatus as claimed in claim 8, wherein the main body has on its upper surface a pair of stereo speaker devices, a first keypad adjacent to the pair of stereo speaker devices, and a microphone device adjacent to the first keypad and the sliding/swing housing has, on its upper surface, a single key, a display device adjacent to the single key, and a second keypad composed of an array of a number of keys adjacent to the display device.

10. The portable apparatus as claimed in claim 9, wherein the first and second keypads are directly adjacent to each other in a first position wherein the sliding/swing housing is fully slid and the pair of stereo speaker devices and the display device are directly adjacent to each other in a second position wherein the sliding/swing housing is fully swung.

11. The portable apparatus as claimed in claim 1, wherein the main body has a camera lens and a lighting device adjacent to the camera lens positioned on an upper portion of the bottom surface thereof.

12. A portable apparatus comprising:
   a main body;
   a sliding/swing housing positioned on an upper surface of the main body, the sliding/swing housing adapted to slide along a longitudinal direction of the main body while being parallel to and continuously facing the main body and adapted to swing about a second hinge axis, which is spaced from and perpendicular to a first hinge axis and which is perpendicular to the longitudinal direction, while being parallel to and continuously facing the upper surface, the upper surface being opposite to the bottom surface;
   a first keypad composed of an array of a number of keys mounted on the upper surface of the main body;
   a pair of stereo speaker devices mounted on the upper surface of the main body;

a microphone device mounted on the upper surface of the main body;

a battery cover coupled to the bottom surface of the main body in a predetermined position so that the battery cover rotates about the first hinge axis toward or away from the main body and provided with a folding force, at less than a first angle relative to the bottom surface of the main body, in such a direction that it is folded on the main body, an unfolding force at between the first angle and a second angle, the second angle being greater than the first angle, and a retaining force at the second angle for retaining the main body in an upright position at a slant; and a battery pack removably attached to the battery cover.

13. The portable apparatus as claimed in claim 12, wherein the pair of stereo speaker devices are adjacent to the first keypad and the first keypad is adjacent to the microphone device.

14. The portable apparatus as claimed in claim 12, wherein the battery pack is integrally moved together with the battery cover.

15. The portable apparatus as claimed in claim 12, wherein the main body and the sliding/swing housing have different lengths.

16. The portable apparatus as claimed in claim 12, wherein the battery cover has a connection unit for connection to the battery pack and the battery pack is adapted to be moved along the inner surface of the battery cover to be attached to and detached from the connection unit.

17. A portable apparatus comprising:

a main body;

a sliding/swing housing positioned on an upper surface of the main body, the sliding/swing housing adapted to slide alone a longitudinal direction of the main body while being parallel to and continuously facing the main body and adapted to swing about a second hinge axis, which is spaced from and perpendicular to a first hinge axis and which is perpendicular to the longitudinal direction, while being parallel to and continuously facing the upper surface;

a battery cover coupled to a lower end of a bottom surface of the main body in such a manner the battery cover rotates about the first hinge axis toward or away from the main body, the upper surface being opposite to the bottom surface;

a battery housing integrally provided on an inner surface of the battery cover to be received on the bottom surface of the main body;

a self-retaining means mounted on the bottom surface of the main body along the longitudinal direction to support the main body at a slant; and a battery pack removably attached to the battery housing.

18. The portable apparatus as claimed in claim 17, wherein the self-retaining means comprises:

a reception groove recessed from the bottom surface of the main body along the longitudinal direction;

a rod-type member received in the reception groove with an end thereof guided to slide along the groove and act as the first hinge axis, and an other end thereof released from the reception groove to contact the outer surface of the battery housing and support the main body at the slant;

and a number of retaining grooves formed on an outer surface of the battery housing.

19. The portable apparatus as claimed in claim 18, wherein the end of the rod-type member has a spherical shape and can rotate in both horizontal and vertical directions while being coupled to the reception groove and the other end thereof is made of rubber material for maximized friction force.

20. The portable apparatus as claimed in claim 18, wherein the reception groove comprises a first reception groove and a second reception groove having width and depth larger than those of the first reception groove.

21. The portable apparatus as claimed in claim 17, wherein the battery housing has a slot to receive the battery pack and a detachment button adjacent to the slot to detach the battery pack.

22. A portable apparatus comprising:

a main body;

a sliding/swing housing positioned on an upper surface of the main body, the sliding/swing housing adapted to slide alone a longitudinal direction of the main body while being parallel to and continuously facing the main body and adapted to swing about a second hinge axis, which is spaced from and perpendicular to a first hinge axis and which is perpendicular to the longitudinal direction, while being parallel to and continuously facing the upper surface;

a speaker device mounted on the upper surface of the main body and exposed or hidden according to whether the sliding/swing housing is swung or not;

a battery pack coupled to a bottom surface of the main body in a predetermined position, the bottom surface being opposite to the upper surface, so that it can rotate about a the battery pack rotates about the first hinge axis and provided with a folding force at less than a first angle in such a direction that it is folded on the main body, an unfolding force at between the first angle and a second angle, the second angle being greater than the first angle, and a retaining force at the second angle for retaining the main body with a slant on its own; and a first holding device positioned between the battery pack and the bottom surface of the main body to easily maintain the seating position of the battery pack during seating.

23. The portable apparatus as claimed in claim 22, wherein the holding device comprises:

at least one holding protrusion provided on the battery pack and a holding opening provided on the bottom surface of the main body to be coupled to the holding protrusion.

24. The portable apparatus as claimed in claim 23, wherein at least one pair of holding protrusions protrude from the lateral end of the battery cover away from it, respectively, and the holding opening is formed on a reception space of the bottom surface of the main body and corresponds to the holding protrusions.

25. The portable apparatus as claimed in claim 22, wherein the holding device has a semi-conical shape.

26. The portable apparatus as claimed in claim 22, further comprising a second holding device positioned between the bottom surface of the main body and the battery pack to support the received battery pack.

27. The portable apparatus as claimed in claim 26, wherein the second holding device comprises:

a protrusion formed on the upper surface of the battery pack; and, a holding groove formed on the reception space to be coupled to the protrusion.

* * * * *